UNITED STATES PATENT OFFICE.

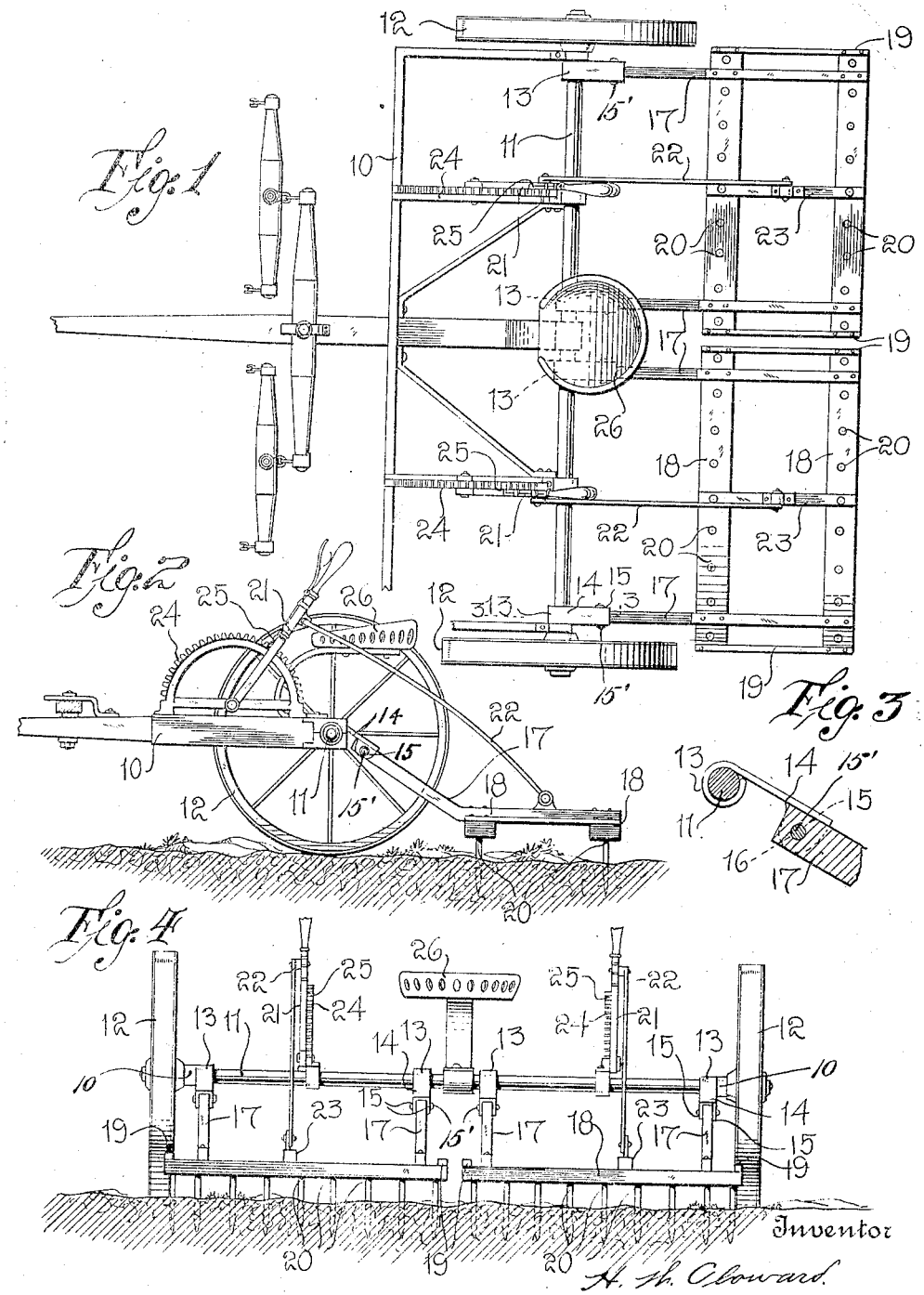

HYRUM W. CLOWARD, OF MORONI, UTAH.

RIDING-HARROW.

1,329,580.  Specification of Letters Patent.  Patented Feb. 3, 1920.

Application filed September 27, 1918. Serial No. 255,973.

*To all whom it may concern:*

Be it known that I, HYRUM W. CLOWARD, a citizen of the United States, residing at Moroni, in the county of Sanpete, State of Utah, have invented certain new and useful Improvements in Riding-Harrows; and I do hereby declare the following to be a full, clear, and exact description of the invention, such as will enable others skilled in the art to which it appertains to make and use the same.

This invention relates to new and useful improvements in agricultural machines and particularly to harrows.

One object of the present invention is to provide a novel and improved device of this character on which the operator sits so that he can raise or lower the digging members as desired.

Another object is to provide a novel and improved device of this character which includes an efficient construction of harrow and means for pivotally connecting the same to the wheeled frame of the machine.

Other objects and advantages will be apparent from the following description when taken in connection with the accompanying drawing.

In the drawing:

Figure 1 is a top plan view of a harrow made in accordance with my invention.

Fig. 2 is a side elevation of the machine, one of the wheels being removed.

Fig. 3 is an enlarged vertical sectional view taken on the line 3—3 of Fig. 1.

Fig. 4 is a rear elevation of the machine, the digging members being lowered.

Referring particularly to the accompanying drawing, 10 represents an elongated frame on which is carried an axle, as shown at 11, ground engaging wheels 12 being mounted on the ends of the axle. Secured to the axle are members which include the portions 13 engaged in embracing relation around the axle, the rearwardly extending portions 14, and the downturned parallel portions 15, which have openings 16 for the reception of the pivot pins or bolts 15'. Disposed between each pair of portions 15 is the upper forward end of a bar 17, said end being apertured to receive one of the pivot pins or bolts 15', whereby said bar is adapted for vertical swinging movement, as will be readily understood. The lower portion of each of the bars 17 is bent to extend at an obtuse angle from the upper or remaining portion of the bar, so that when the bars are in lowered position, this rear or lower portion will lie in approximately horizontal relation to the ground. Secured to these bars 17, of which there are four, are the transversely extending parallel members 18, their ends being connected by the forwardly and rearwardly extending end members 19, whereby two harrow frames are formed. Carried by each of the members 18 are the downwardly extending harrow teeth 20, which are arranged to dig into the soil to the depth desired, according to the elevation of said frames. Carried by the frame 10 are the vertical pivoted levers 21 each having pivotally connected therewith a downwardly and rearwardly extending link 22, which link is pivotally connected, at its other end, to a bar 23 which connects the parallel members 18. Rack segments 24 are mounted on the frame 10, adjacent the levers for engagement by the pawls 25 thereon.

A seat 26 is mounted on the frame 10 for the driver, the same being conveniently located for the ready access to the levers 21. A draft means is connected to and extends from the other side of the frame 10, for attachment of draft animals.

Thus by movement of the levers, the driver can raise or lower the harrow frames so as to permit the teeth thereof to dig into the soil to the depth desired. The axle carried members form an efficient means whereby the harrow frames are pivotally connected to the body of the machine and are readily capable of being swung upwardly clear of the ground, when driving along a road or from one field to another.

What is claimed is:

A harrow including a frame having an axle, harrow elements disposed at the rear of the frame, members having portions embracing the axle, said members also having rearwardly and downwardly extending apertured ears, and obtuse angular bars connected to the harrow elements and pivotally supported between said ears.

In testimony whereof, I affix my signature, in the presence of two witnesses.

HYRUM W. CLOWARD.

Witnesses:
 RANDALL C. CHRISTENSEN,
 E. D. ANDERSON.